United States Patent [19]

Mathauser

[11] 3,921,764
[45] Nov. 25, 1975

[54] SELF-ENERGIZING BICYCLE BRAKE
[76] Inventor: William R. Mathauser, P.O. Box 5, Sun Valley, Idaho 83353
[22] Filed: July 25, 1973
[21] Appl. No.: 382,345

[52] U.S. Cl............................ 188/24; 188/72.2
[51] Int. Cl.² ........................................ B62L 1/14
[58] Field of Search ....... 188/24, 344, 72.2; 74/520, 74/106

[56] References Cited
UNITED STATES PATENTS
2,160,181    5/1939   Taylor.................................. 188/24

FOREIGN PATENTS OR APPLICATIONS
917,424      1/1947   France................................. 188/24
1,141,172    8/1957   France................................. 188/24
675,533      7/1952   United Kingdom................... 188/24
1,093,809   12/1967   United Kingdom................... 188/24
605,784      2/1926   France................................. 188/24
592,647      8/1925   France................................. 188/24
897,819      4/1945   France............................... 188/72.2
898,521      4/1945   France............................... 188/72.2
903,456     10/1945   France............................... 188/72.2
935,317      6/1948   France............................... 188/72.2
979,250      4/1951   France............................... 188/72.2
1,333,167   12/1963   France................................. 188/24

Primary Examiner—Trygve M. Blix
Assistant Examiner—Sherman D. Basinger
Attorney, Agent, or Firm—Shoemaker and Mattare

[57] ABSTRACT

A self-energizing bicycle brake, comprising a mounting yoke to mount the brake to a bicycle frame adjacent a wheel rim of the bicycle, brake block support arms connected to the yoke on opposite sides of a wheel of the bicycle and movable both toward the wheel and in the direction of travel of the wheel, brake blocks carried by the arms on opposite sides of the wheel and movable with the arms toward the wheel and into engagement with the rim of the wheel, so that upon engagement of the brake blocks with the wheel rim, the frictional drag between the brake blocks and wheel rim energizes the brake blocks into more firm engagement with the wheel rim, and an actuator connected with the brake blocks to actuate the brake blocks into engagement with the wheel rim.

17 Claims, 13 Drawing Figures

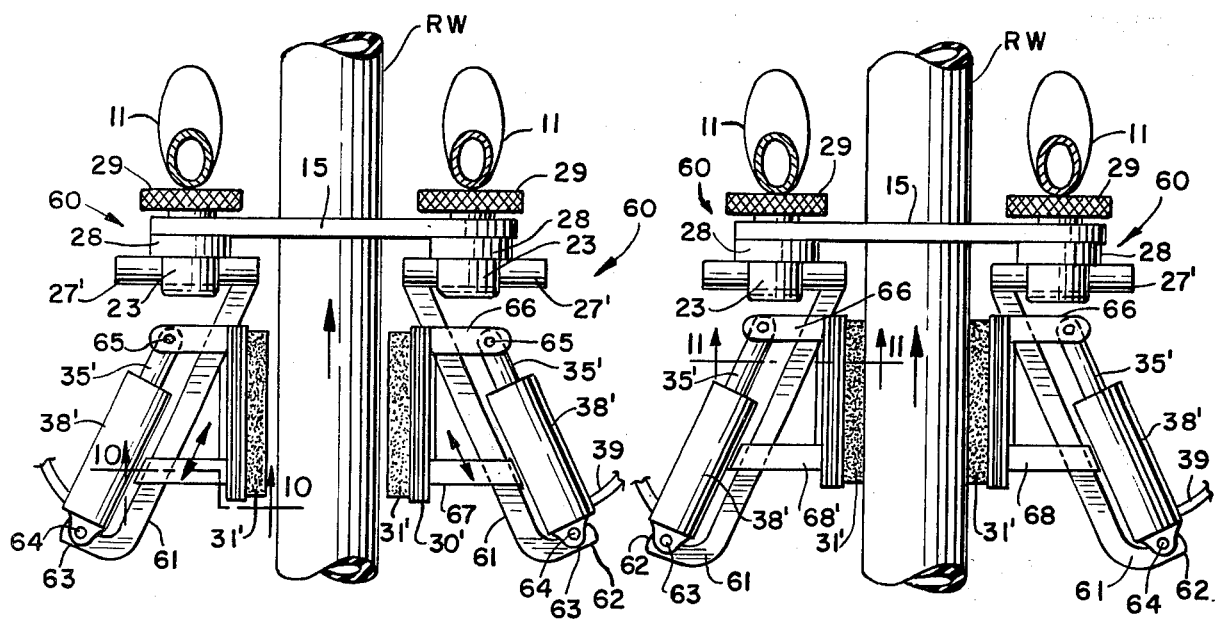

ABOUT 3,921,764

SELF-ENERGIZING BICYCLE BRAKE

BACKGROUND OF THE INVENTION

This invention relates to bicycle brakes, and more particularly, to a self-energizing bicycle brake which, upon engagement with the wheel rim, is energized by the frictional drag between the wheel rim and brake into more firm engagement with the wheel, thus requiring less effort on the part of the person riding the bicycle to energize the brakes of the bicycle to stop or slow forward motion of the bicycle.

In the prior art, bicycle brakes are usually of the caliper type and are mounted on opposite sides of the rim of the wheel of the bicycle and are energized perpendicularly to the plane of the wheel into engagement with the rim thereof to slow or stop forward motion of the bicycle. With such prior art bicycle brake arrangements, substantial force is required in order to engage the brake blocks with the rims of the wheel with sufficient force to stop forward motion of the bicycle, and damage to the brake components can easily occur if excessive force is applied.

In the present invention, the brakes are self-energizing since the brake blocks are actuated in a direction both toward the wheel and in the direction of movement of the wheel, so that upon engagement of the brake blocks with the rim of the wheel, the frictional drag between the brake blocks and rim of the wheel urges the brake blocks into more firm engagement with the rim of the wheel and thus, the forward motion of the bicycle may be slowed or stopped with very little effort required on the part of the person riding the bicycle. The brake shoe material is preferably of a suitable anti-locking type and has sufficient slippage to prevent locking of the brakes unless maximum braking pressure is applied. Further, the actuating supports for the brake are designed to prevent jamming or lock-up of the brakes when they are energized, even if standard brake shoe material is used.

The brakes of the present invention are easily operated with either a cable operating mechanism or with a hydraulic operating mechanism and the supporting and actuating structure for the brakes of the present invention are both rugged and simple in construction and thus, economical to manufacture. Further, the brakes of the present invention are more compact and efficient than prior art bicycle brakes, and the support structure for the brake insures uniform braking pressure on opposite sides of the wheel.

The brakes of the present invention may be easily and quickly installed on existing bicycles and adjustment of the brakes of the present invention is quickly and easily accomplished. Further, the braking force exerted on the brakes of the present invention is transmitted directly through the brake support means to the frame of the bicycle, thus enabling the use of relatively lightweight components in the construction of the brake support, and relieving stresses which would otherwise be imposed on the brake supports.

OBJECTS OF THE INVENTION

It is an object of this invention to provide a self-energizing bicycle brake which is simple and economical in construction and easy to install and operate.

Another object of the invention is to provide a self-energizing bicycle brake which is easy to install and operate and which requires very little effort to energize and which is anti-self-locking and returns to its normal, rest position when the braking force is removed therefrom.

A further object of the invention is to provide a bicycle brake comprising a material to quickly dissipate heat generated during braking.

BRIEF DESCRIPTION OF THE DRAWINGS

FIG. 7 is a view similar to FIG. 4 of a further form of the present invention.

FIG. 8 is a view similar to FIG. 7 with the brake of FIG. 7 in energized position.

FIG. 9 is a fragmentary sectional view in elevation of the brake of FIG. 7.

FIG. 10 is an enlarged, fragmentary, sectional view taken along line 10—10 in FIG. 7.

FIG. 11 is an enlarged, fragmentary, sectional view taken along line 11—11 in FIG. 8.

FIG. 12 is a view similar to FIG. 4 with a different type of actuating means for the brake of FIG. 4.

DETAILED DESCRIPTION OF THE INVENTION

Figure 1:
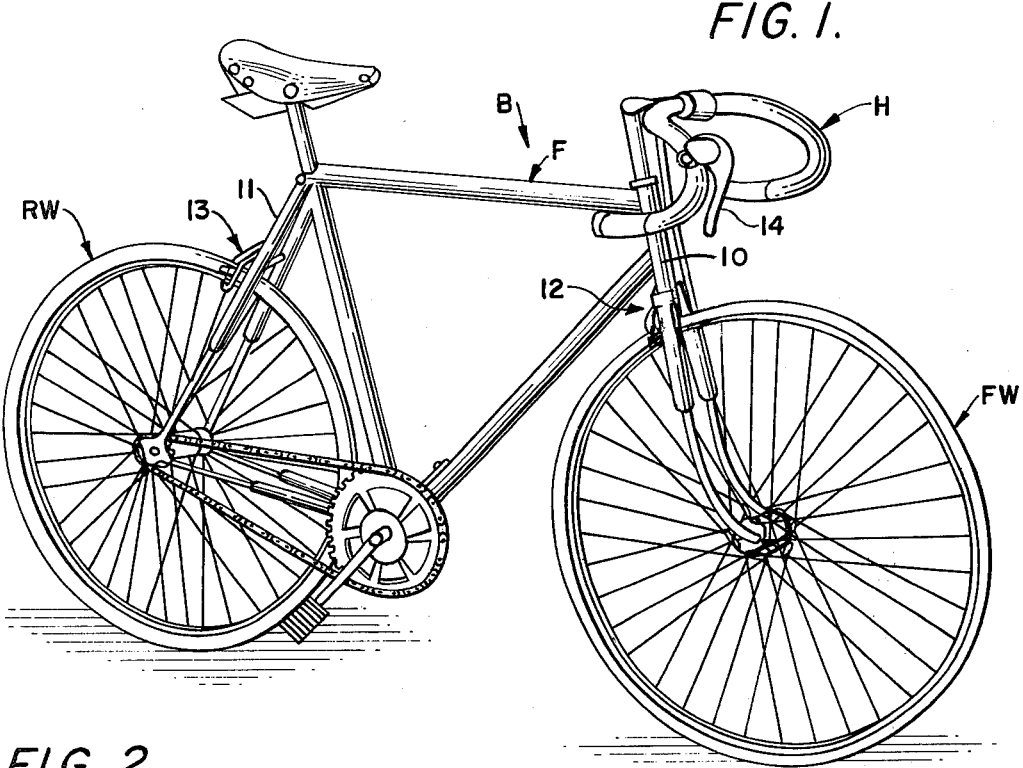
FIG. 1 is a perspective view of a bicycle incorporating the brake arrangement of the present invention.

In the drawings, wherein like reference numerals indicate like parts throughout the several views, a bicycle B includes a frame F, handle bar H and front and rear wheel FW and RW, respectively, supported by front forks 10 and rear forks or frame stays 11, respectively.

A front brake 12 in accordance with the invention is supported on the front forks 10, behind the forks and in operative association with the front wheel FW, and a substantially identical rear brake 13 in accordance with the invention is supported on the rear frame stays or forks 11, behind the frame stays and in operative association with the rear wheel RW. Suitable hand operated actuating means 14 is supported on the handle bar H for actuating the brakes 12 and 13. The hand operated actuating means, in a preferred form of the invention, comprises a master cyclinder filled with brake fluid and operatively connected with the front and rear brakes to operate the brakes. The master cylinder may be properly designed, in a known manner, to cause operation of the rear wheel brake prior to operation of the front wheel brake.

Figure 2:
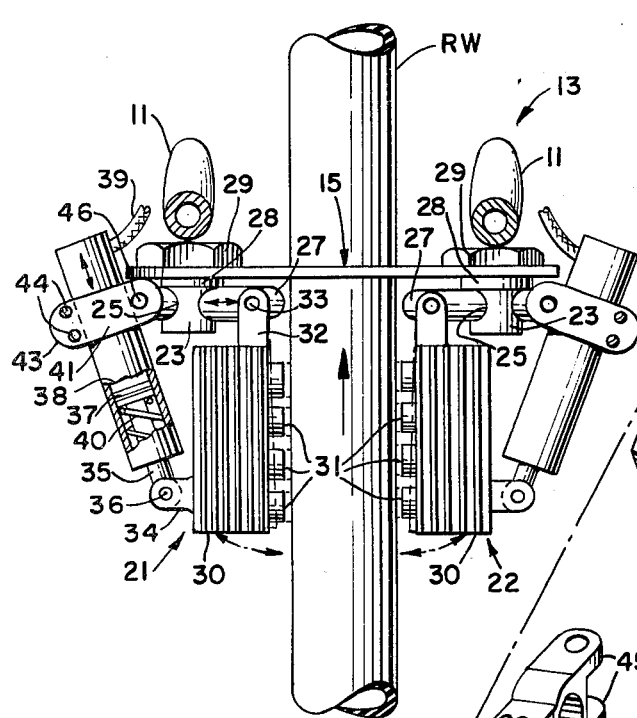
FIG. 2 is an enlarged, fragmentary, plan view of one form of the brake of the present invention, showing parts in section.
Figure 3:
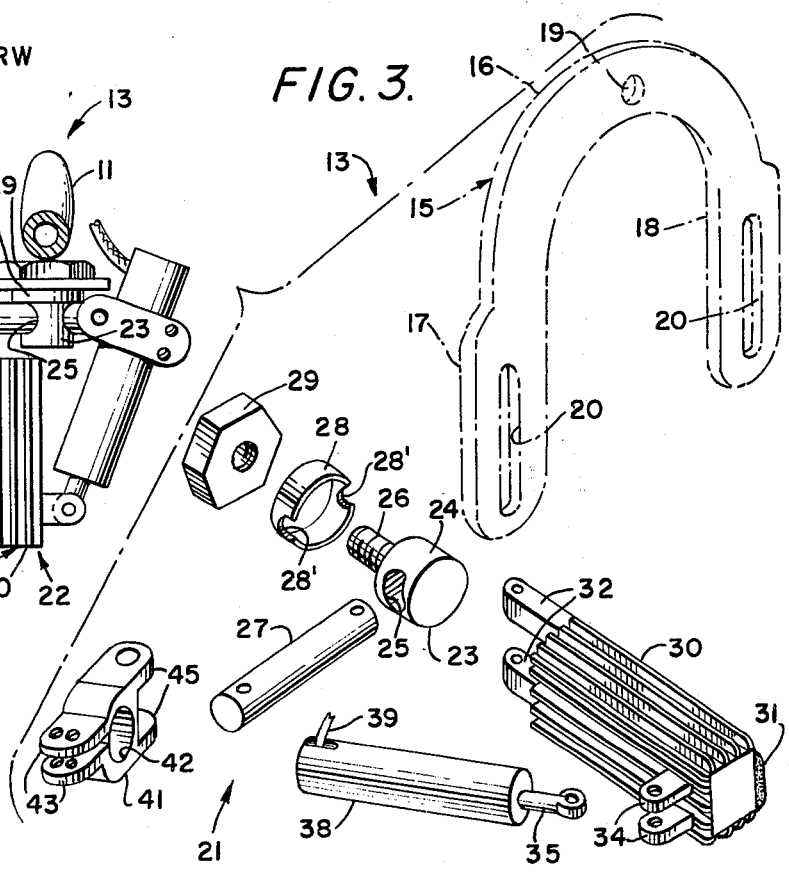
FIG. 3 is an enlarged, exploded, perspective view of the components of one of the brakes of one form of the present invention.

In FIGS. 2 and 3, a first form of brake 13 according to the invention is positioned to the rear of forks or stays 11 in operative association with the rear wheel RW of the bicycle, it being understood that the front brake 12 is substantially identically constructed, and the brake 13 comprises a generally inverted U-shaped mounting yoke 15 with a bight portion 16 and a pair of opposite, downwardly extending legs 17 and 18. An opening 19 extends through the center of the bight portion for receiving a bolt or the like therethrough to attach the yoke 15 to the rear forks or stays 11 of bicycle B, and an elongate, substantially vertically extending slot 20 is in a lower end portion of each of the legs 17 and 18.

A pair of substantially identical brake block units 21 and 22 are carried by the yoke 15 on opposite sides of the rear wheel RW in operative association with the rim of the wheel. Each unit comprises a take-up pin 23 having a diametrically enlarged head 24 with a diametrically extending bore 25 therethrough and a threaded bolt or extension 26 extending axially from one end thereof, said bolt or extension 26 projecting through the slot 20, with the enlarged head 24 to the rear of leg 17. An elongate, cylindrical adjustment pin 27 is slidably received through said bore 25 and a cylindrical jam sleeve or collar 28 is received over said bolt 26 and the end of head portion 24 into engagement with the pin 27 at opposite ends of bore 25. The collar 28 may have arcuate cut-outs 28' in opposite sides thereof, for engaging the side of pin 27, if desired. A nut 29 is threaded on the bolt against the front side of the yoke 15 to draw the take-up pin toward the yoke and thus jam the jam sleeve or collar 28 between the yoke and the adjustment pin 27 to jam or lock the adjustment pin in axially adjusted position through the bore 25 and to jam or lock the pin 23 in vertically adjusted position in the slot 20. A pair of finned brake blocks or housings 30, each having a laterally protruding brake shoe 31 with a plurality of longitudinally spaced pads 31' along one side thereof, are positioned on opposite sides of the wheel with the shoes or pads 31 in substantial parallelism with the plane of the wheel. The brake shoe preferably comprises a plastic material, such as natural or synthetic rubber, or nylon, or polyurethane, and the like, or other material, impregnated with metal particles M, such as flakes of copper or aluminum or the like, or both, or metal strands and the like, in sufficient quantity and close proximity to one another for maximum dissipation of heat from the rim of the wheel and through the finned housing. Preferably, the metal particles comprise about 70 percent, by volume, of the brake shoe, and the particles are preferably contiguous with one another. This dissipation of heat is particularly important when riding the bicycle down long grades or when carrying a heavy load, and the like. A pair of spaced apart, axially extending mounting arms 32 extend from one end of the block 30 and are positioned on opposite sides of the adjustment pin 27 and the block is pivotally secured to the pin 27 by means of a pivot pin or the like 33 extended through the arms 32 and the pin 27. A pair of spaced apart, laterally extending ears or lugs 34 project from the side of block 30 opposite the shoes 31 near the other end of the block 30 and an actuating rod 35 extends between the ears 34 and is pivotally connected thereto by means of a pivot pin 36 or the like extended through the ears and an eye formation at the end of the rod 35. The rod 35 is connected to a piston 37 within a cylinder 38, to be reciprocably operated by the piston upon introduction or pressurized brake fluid to the cylinder through a fluid conduit 39 connected with the actuating means 14 on the handle bar H of the bicycle. A suitable return spring 40 is engaged between the piston and the end of the cylinder for returning the piston to a retracted position to retract the shoes or pads 31 from the rim of the wheel.

A bifurcated clamping bracket or sleeve 41 has a central opening 42 therethrough in which the cylinder 38 is slidably received. A pair of laterally protruding clamping jaws or ears 43 project from one side of the sleeve 41, and a pair of threaded clamping screws 44 are threadably engaged in the ears 43 to clamp the sleeve about the cylinder 38 to securely hold the cylinder in axially adjusted position in the sleeve 41. A pair of spaced apart, laterally projecting attaching ears 45 protrude from the other side of the sleeve 41, and the other end of adjustment pin 27 is received therebetween and pivotally secured thereto by a pivot pin 46 extended through the ears 45 and pin 27. By suitable adjustment of the brake relative to the wheel is quickly and easily accomplished. Preferably, the shoes 31 are positioned substantially parallel to the plane of the wheel, and the pin 27, cylinder 38, and brake block 30 define a triangular arrangement, so that when the brakes are actuated and the shoes contact the rim of the wheel, frictional drag between the shoes and rim energizes the brakes into more firm engagement with the rim of the wheel to slow or stop the bicycle with a minimum amount of effort on the part of the person riding the bicycle. As the shoes 31 become worn, the nut 29 may be loosened, enabling the adjustment pin 27 to be moved toward the wheel, and the screws 44 may be loosened to enable the cylinder to be moved toward the wheel, to properly position and adjust the shoes 31 relative to the rim of the wheel.

The yoke 15 is enabled to pivot from side to side about the bolt received through opening 19 to provide an equal braking force on each side of the wheel, and the dimensions of the brake and supporting structure relative to the wheel are such as to prevent lock-up or jamming of the brake when it is energized, although the brake is capable of being locked to stop the bicycle if maximum braking pressure is applied. Further, the brake shoe material is preferably of a heat dissipating type as previously described, or of a commerically available anti-self-locking type, to enable the brake to retract from the wheel under the influence of spring 40, when pressure is removed from the actuator.

Figure 4:
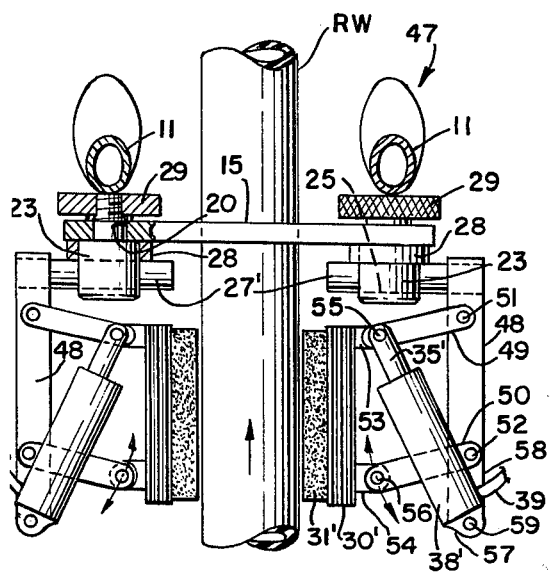
FIG. 4 is a view similar to FIG. 2 of a modified brake according to the present invention, in its normal or unenergized position.
Figure 5:
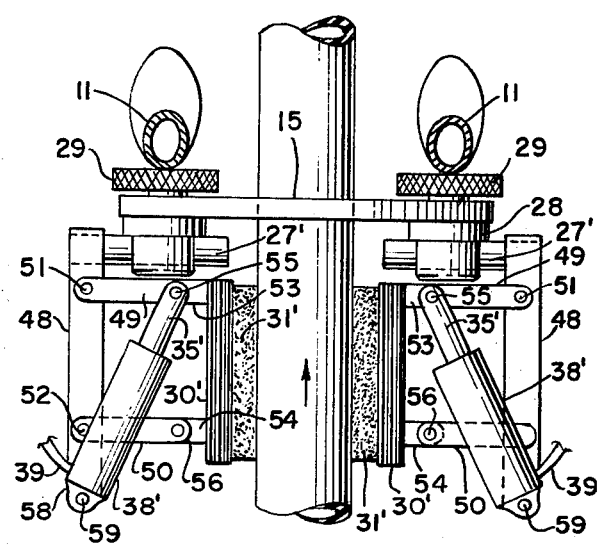
FIG. 5 is a view similar to FIG. 4 with the brake in energized position.
Figure 6:
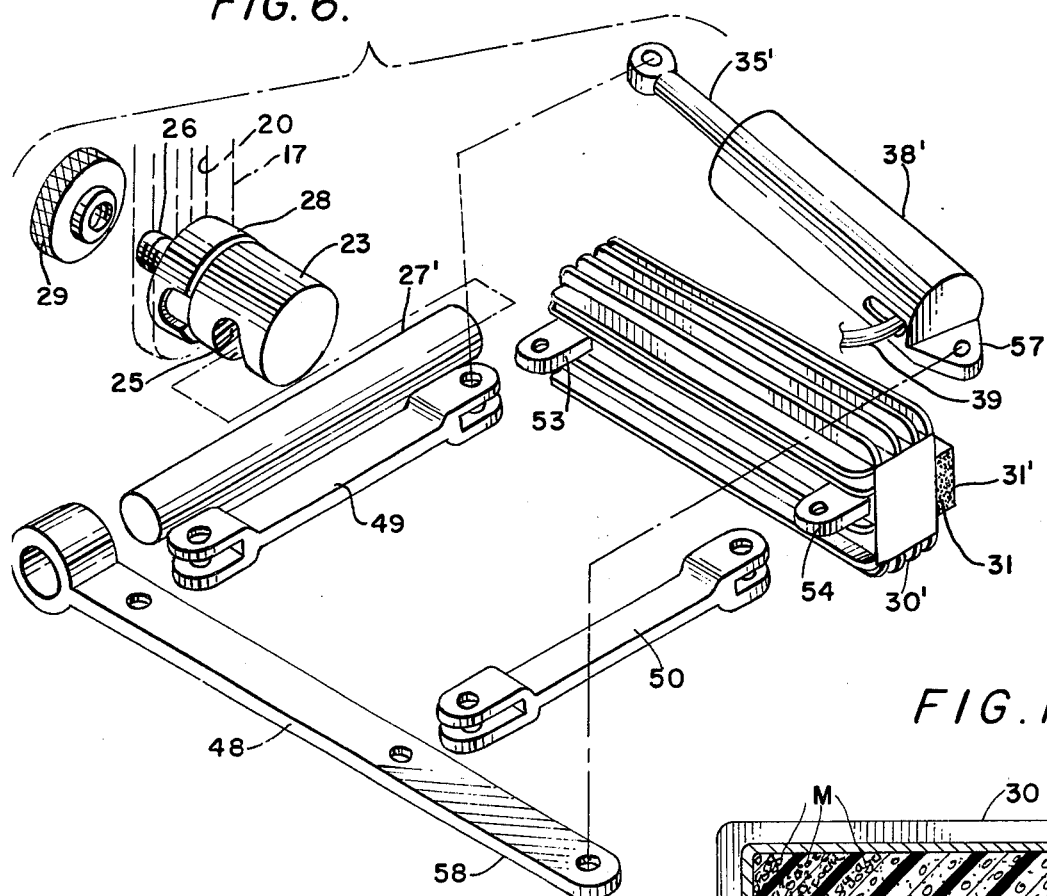
FIG. 6 is an enlarged, exploded, perspective view of the modified brake of FIGS. 4 and 5.
Figure 13:
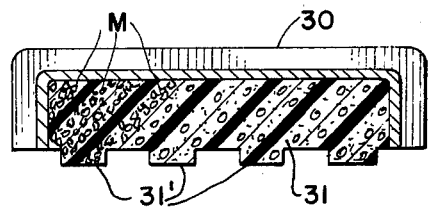
FIG. 13 is an enlarged, sectional view of a brake block and shoe according to the invention.

A modified self-energizing brake 47 in FIGS. 4 through 6 is similarly supported on the rear forks or stays 11 of the bicycle B by means of a yoke 15, take-up pin 23, jam sleeve or collar 28 and nut 29, adjustably secured on the yoke 15 in slots 20. As in the first embodiment of the invention, the front brake 12 is substantially identical with the rear brake, and accordingly, only the rear brake 13 will be described.

An adjustment pin 27' is adjustably clamped in bore 25 of take-up pin 23 by the jam sleeve 28, and an elongate support bar 48 is suitably secured at one end thereof to the outer end of adjustment pin 27' and extends substantially perpendicular thereto. A pair of parallel support arms 49 and 50 are pivotally connected at one of their ends to the bar 48, adjacent opposite ends of the bar, by means of pivot pins 51 and 52, respectively. An elongate, substantially rectangular brake block 30' has a pair of upstanding lugs 53 and 54 thereon adjacent opposite ends thereof and the other ends of arms 49 and 50 are pivotally connected thereto by means of pivot pins 55 and 56, the brake block 30', bar 48, and arms 49 and 50 defining a parallelogram linkage. A cylinder 38' has an axially extending mounting lug 57 on one end thereof, and said lug is pivotally connected to an extended end portion 58 of the bar 48 by means of a pivot pin 59, or the like. An actuating rod 35' extends from the other end of cylinder 38' and is pivotally secured to lug 53 of brake block 30' by means of pivot pin 55, so that when pressure fluid is admitted to cylinder 38' through conduit 39 the rod 35' is extended and the brake block 30' is swung forwardly and toward the rim of the wheel RW to engage the rim and slow or stop the bicycle. As in the previous form of the invention, when the brake shoe 31' engages the rim of the wheel, the frictional drag between the brake shoe and rim energizes the shoe into more firm engagement with the rim of the wheel so that less force is required by the rider of the bicycle to operate the brake. Also, as in the previous form of the invention, the components comprising the brake may be of light weight construction, since the force imposed on the brake when it engages the wheel is transmitted directly through the take-up pin 23 and nut 29 to the forks or stays 11 of the bicycle. Further, the length of arms 49 and 50, and the arrangement of pivot points is such that the brake will not become jammed when energized, and will return to a normal position out of engagement with the rim of the wheel under the influence of spring 40 as in FIG. 2.

Vertical adjustment of this form of the invention is accomplished in the same manner as before, simply by loosening nut 29 and sliding the take-up pin 23 vertically in slot 20 of yoke 15, and adjustment of the brakes toward and away from the wheel is quickly and easily accomplished by loosening nut 29 and sliding adjustment pin 27' in the bore 25 of take-up pin 23.

A third embodiment of self-energizing brake 60 is illustrated in FIGS. 7 through 11 and is secured to the frame of the bicycle with a yoke 15, take-up pin 23, adjustment pin 27' and jam sleeve 28 substantially similarly to the way in which the previously described forms of the invention are secured to the bicycle frame. In this form of the invention, a brake block support rail or slide 61 is secured at one end thereof to one end of the adjustment pin 27' and extends angularly outwardly from the plane of the wheel and has a laterally outwardly turned end portion 62 thereon, to which a flange 63 on one end of a cylinder 38' is secured by means of a pivot pin 64 or the like, extended through the flange 63 and through the laterally turned end portion 62 of rail 61. The cylinder 38' extends substantially parallel to the rail 61 and an actuating rod 35' extends substantially axially from the other end of the cylinder and is pivotally secured by means of a pivot pin 65 to the bifurcated end of an upstanding arm 66 projecting laterally from the rear of brake block 30' near one end thereof. The arm 66 has a guide bore 67 therethrough near the base thereof, and the rail 61 is slidably received therein. The other end of the brake block 30' is supported by an arm 68 extending laterally from the other end of brake block 30'. The arm 68 has a guide bore 69 therethrough, in which the rail 61 is slidably positioned. Accordingly, as the cylinder 38' is supplied with pressurized fluid, the rod 35' is extended, pushing the arm 66 forwardly and toward the wheel and the arm 68 slides along rail 61 to maintain the brake shoe 31' in parallel relationship to the rim of the wheel as the shoe moves into engagement with the rim. As in the previously described forms of the invention, engagement of the brake shoe with the rim of the wheel energizes the shoe into even more firm engagement with the wheel to slow or stop the bicycle with a minimum amount of effort on the part of the rider of the bicycle.

Adjustment of the brake 60 relative to the wheel is accomplished in substantially the same manner as in the embodiment of the invention in FIGS. 4 through 6.

A fourth form of self-energizing brake 70 is supported on the rear frame stays 11, or on the front forks, as in the previously described embodiments by means of the yoke 15, take-up pin 23, jam sleeve 28 and nut 29. As in the embodiment of the invention illustrated in FIGS. 4 through 6, brake 70 includes an adjustment pin 27', adjustably secured in the bore 25 in take-up pin 23, and a support bar 48' is suitably affixed at one end thereof to one end of the take-up pin 27'. A pair of parallel arms 49 and 50 are pivotally secured to the bar adjacent opposite ends thereof and a brake block 30' is pivotally secured to the other ends of the arms in parallel relationship to the plane of the wheel. However, rather than the hydraulic actuating means 38' of FIGS. 4 through 6, a cable actuater 71 is secured to the arm 49 and lug 53 on the brake block 30' by means of a pivot pin 55, for actuating the brake toward the wheel. A return spring 72 is connected between the bar 48' and the pivot pin 55 for returning the brake to its disengaged position.

This form of brake is also prevented from jamming, since engagement between the take-up pin 23 and arm 66 on brake block 30' limit forward travel of the brake block.

Each of the brake blocks illustrated and described herein preferably has cooling fins thereon, and the metal-flake impregnated plastic or rubber material is preferably used as the brake shoe material, although other types of brake blocks and other brake shoe materials can be used. Further, each form of the invention may be cable actuated or hydraulically actuated, as desired, and other arrangements for supporting the brake blocks relative to the wheel may be utilized rather than the specific support and actuating arrangements described and illustrated, such as, for example, a cam actuator, so long as the brake is self-energizing upon engagement with the rim of the wheel. Further, the particular arrangement of parts in each form of the brake described herein, and particularly the adjustment pin 27 in take-up pin 23, enables the brake blocks to be easily angularly adjusted to accomodate different designs of wheel rims. Moreover, in each form of the invention, and as previously noted, the brake units are supported on the rear of either the rear frame stays or the front forks, and the force transmitted to the brakes is transferred directly to the frame of the bicycle so that lightweight components may be used in the construction of the brake and excessive stresses and force are not put on the brake components when the brakes are actuated to slow or stop the bicycle. Also, the hydraulic actuators could comprise bellows units or the like, rather than the piston and cylinder arrangement disclosed, and the hydraulic system for the brakes can be a factory-sealed unit, if desired.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A self-energizing bicycle brake, comprising a substantially inverted U-shaped mounting yoke connected to the frame of a bicycle and extending at its opposite ends on opposite sides of a rim of a wheel of the bicycle, a first brake block adjustment and support means on each end of the yoke for adjustment in a first direction substantially parallel to the plane of the wheel, said first adjustment and support means comprising an elongate slot in each end of the yoke extending substantially parallel to the plane of the wheel and a first pin extended through said slot for movement therealong, said first pin having an opening extending transversely therethrough, a second brake block adjustment and support means adjustably mounted to said pin for adjustment in a second direction substantially perpendicular to the plane of the wheel, said second adjustment and support means including a second elongate adjustment pin extended through the hole in the first pin for movement toward and away from the wheel, means for securing the second pin in adjusted position relative to the first pin, brake block means carried by said second pin for adjustment thereof in said first and second directions and for movement toward and away from the wheel rim into and out of braking engagement with the wheel rim, and actuating means connected with the brake block means to actuate the brake block means both in a direction toward the wheel and in the direction of travel of the wheel, whereby said brake is self-energizing upon engagement with the wheel rim.

2. A self-energizing bicycle brake as in claim 1, wherein said bicycle includes rear frame stays supporting a rear wheel and front forks supporting a front wheel, and a mounting yoke secured to said frame stays and to said front forks associated with a respective front or rear wheel.

3. A self-energizing bicycle brake as in claim 2, wherein said mounting yokes are secured to the rear of said frame stays and front forks, respectively, and said mounting yokes are operatively engaged with said rear frame stays and front forks, respectively, so that the braking force exerted on the bicycle brake is transmitted directly to the rear frame stays and front forks, enabling the use of lightweight components in the construction of said bicycle brake.

4. A self-energizing bicycle brake as in claim 1, wherein said first pin comprises a take-up pin having a bore therethrough extending substantially perpendicular to the plane of the wheel, said second pin comprises an elongate adjustment pin slidably received through said bore and extending substantially perpendicular to the plane of the wheel for adjustment toward and away from the wheel to adjust the brake and accomodate different size wheel rims, means to secure said adjustment pin in different adjusted positions, and movable support arm means connected between said adjustment pin and said brake block for movement of said brake block means toward the wheel rim to brake the bicycle when said actuating means is energized and to enable adjustment of said brake block means relative to said wheel rim.

5. A self-energizing bicycle brake as in claim 4, wherein said means to secure said take-up pin and said adjustment pin in different adjusted positions comprises a threaded extension on said take-up pin received through said slot in said yoke, a nut threaded on said threaded extension and against said yoke urging said take-up pin toward said yoke, and a jam sleeve received over said take-up pin on the side of said yoke opposite said nut, said jam sleeve engaged against the side of said adjustment pin and said yoke to secure said take-up pin in adjusted position in said slot and to secure said adjustment pin in adjusted positions in said bore in said take-up pin.

6. A self-energizing bicycle brake as in claim 1, wherein said brake block means comprises a substantially rectangularly shaped brake block, a substantially rectangularly shaped brake pad carried by said brake block, and said adjustment and support means is operatively connected between said yoke and said brake block to support the brake block and brake pad substantially parallel to the plane of the wheel.

7. A self-energizing bicycle brake as in claim 1, wherein said bicycle comprises a frame including front wheel forks and rear frame stays operatively supporting front and rear wheels, respectively, and a mounting yoke secured to each of the rear of the front forks and to the rear of the frame stays, said mounting yokes each having opposite legs extending downwardly on opposite sides of an associated front and rear wheel, said first pin comprising a take-up pin supported on each leg, and each take-up pin having a threaded extension on one end thereof extended through said slot and having a bore through the other end thereof extending substantially perpendicular to the plane of the wheel, said second pin comprising an elongate adjustment pin slidably received in said bore and extending substantially perpendicular to the plane of the wheel, a jam sleeve on said take-up pin between said adjustment pin and said yoke, and a nut threaded on said extension on the side of said yoke opposite said jam sleeve and urging said take-up pin toward said yoke to jam said jam sleeve against said yoke and said adjustment pin to secure said adjustment pin in adjusted positions in said bore.

8. A self-energizing bicycle brake as in claim 7, wherein said brake block means comprises an elongate, substantially rectangular brake block, a substantially rectangular brake shoe carried by said brake block for engagement with the rim of the wheel, support arm means connected at one end thereof to one end of the brake block and pivotally connected at the other end thereof to the end of said adjustment pin adjacent said wheel, an hydraulic brake block actuating means pivotally connected at one end thereof to the other end of the brake block and pivotally connected at its other end to the other end of said adjustment pin.

9. A self-energizing bicycle brake as in claim 7, wherein an elongate support bar is connected at one end thereof to the end of said adjustment pin remote from said wheel and said bar extends substantially parallel to the plane of the wheel, a pair of substantially parallel support arms pivotally connected at one of their ends to the bar adjacent opposite ends of the bar said brake block means including a brake block and a brake shoe carried by said brake block, the other ends of said arms pivotally connected to said brake block adjacent opposite ends of the brake block and supporting said brake block substantially parallel to the plane of the wheel, said bar, said arms and said brake block defining a parallelogram linkage, and said actuating means is connected to said brake block to move said brake block toward the wheel.

10. A self-energizing bicycle brake as in claim 9, wherein said actuating means comprises a hydraulic piston and cylinder connected at one end thereof to the other end of said bar and connected at the other end thereof to the pivotal connection of the brake block with one of said support arms.

11. A self-energizing bicycle brake as in claim 9, wherein said actuating means comprises a cable connected at one end thereof to said brake block to pull said brake block toward said wheel.

12. A self-energizing bicycle brake as in claim 7, wherein an elongate support rail is connected at one end thereof to the end of said adjustment pin adjacent said wheel and extends angularly outwardly from said wheel at its other end, a pair of brake block support arm means extend substantially perpendicular from said brake block means adjacent opposite ends of said brake block means, said support arm means slidably engaged on said rail to support said brake block means for sliding movement along said rail and toward and away from said wheel, and a hydraulic piston and cylinder is connected at one end thereof to the other end of said rail and is connected at its other end to one of said support arm means to actuate said brake block means along said rail toward and away from said wheel.

13. A self-energizing bicycle brake as in claim 1, wherein said mounting yoke has opposite depending legs extending on opposite sides of the wheel, said first pin comprises an adjustment pin supported on the yoke and extending substantially perpendicularly to the plane of the wheel, said brake block means comprises a brake block and a brake shoe carried by the brake block, said brake block pivotally supported at one end thereof to the end of said adjustment pin adjacent said wheel, and hydraulic piston and cylinder means connected at one end thereof to the other end of said adjustment pin and connected at its other end to the other end of said brake block to energize said brake block toward said wheel.

14. A self-energizing bicycle brake as in claim 1, wherein said mounting yoke has opposite, depending legs extending downwardly on opposite sides of the wheel, said first pin comprises an elongate adjustment pin adjustably carried by the legs of the yoke on opposite sides of the wheel and extending substantially perpendicularly to the plane of the wheel, an elongate support bar secured at one end thereof to the end of said adjustment pin remote from said wheel, a pair of parallel support arms pivotally connected at one of their ends to said support bar adjacent opposite ends of the support bar, said brake block means comprising a brake block and a brake shoe carried by the brake block, said support arms pivotally connected at their other ends to said brake block adjacent opposite ends of the brake block, said support bar, said support arms and said brake block defining a parallelogram type linkage, and actuating means connected to said brake block to actuate said brake block toward said wheel rim.

15. A self-energizing bicycle brake as in claim 14 wherein said actuating means comprises a hydraulic piston and cylinder assembly connected at one end thereof to an extended end portion of said support bar and connected at the other end thereof to said brake block.

16. A self-energizing bicycle brake as in claim 14, wherein said actuating means comprises a cable connected to said brake block to pull said brake block toward said wheel rim.

17. A self-energizing bicycle brake as in claim 1, wherein said mounting yoke has opposite, depending legs extending on opposite sides of a wheel, said first pin comprises an elongate adjustment pin adjustably carried by the legs of the yoke on opposite sides of the wheel and extending substantially perpendicularly to the plane of the wheel, an elongate support rail secured at one end thereof to the end of said adjustment pin adjacent said wheel and extending angularly outwardly from the plane of the wheel at its other end, said brake block means including a brake block and a brake shoe carried by the brake block, a pair of upstanding support arms on said brake block at the opposite ends thereof, said support arms slidably engaged on said support rail to support said brake block for movement along said rail toward and away from the wheel and substantially parallel to the plane of the wheel, and hydraulic piston and cylinder means connected at one end thereof to the other end of said support rail and connected at its other end to one of said support arms to actuate said brake block means toward said wheel.

* * * * *